United States Patent
Kim et al.

(10) Patent No.: US 8,593,455 B2
(45) Date of Patent: Nov. 26, 2013

(54) METHOD AND SYSTEM FOR COMPRESSING AND DECODING MESH DATA WITH RANDOM ACCESSIBILITY IN THREE-DIMENSIONAL MESH MODEL

(75) Inventors: Ho-Kyung Kim, Seongnam-si (KR); Seung-Yong Lee, Pohang-si (KR); Jong-Seok Lee, Seoul (KR); Sung-Yul Choe, Busan (KR)

(73) Assignees: Samsung Electronics Co., Ltd., Suwon-si (KR); Postech Academy-Industry Foundation, Pohang-si (KR)

( * ) Notice: Subject to any disclaimer, the term of this patent is extended or adjusted under 35 U.S.C. 154(b) by 711 days.

(21) Appl. No.: 12/345,076

(22) Filed: Dec. 29, 2008

(65) Prior Publication Data

US 2009/0184957 A1 Jul. 23, 2009

(30) Foreign Application Priority Data

Jan. 21, 2008 (KR) ........................ 10-2008-0006349

(51) Int. Cl.
*G06T 15/00* (2011.01)

(52) U.S. Cl.
USPC ...... 345/420; 345/419; 345/428; 375/240.08; 382/154; 382/232; 382/239

(58) Field of Classification Search
USPC .................. 345/419, 420, 423, 424, 427, 428; 375/240.08; 382/154, 232, 239
See application file for complete search history.

(56) References Cited

U.S. PATENT DOCUMENTS

| | | | |
|---|---|---|---|
| 5,818,463 A | 10/1998 | Tao et al. | |
| 6,208,347 B1 | 3/2001 | Migdal et al. | |
| 6,559,842 B1 | 5/2003 | Deering et al. | |
| 6,563,500 B1 * | 5/2003 | Kim et al. | 345/423 |
| 6,570,568 B1 * | 5/2003 | Horn et al. | 345/428 |
| 6,577,310 B1 * | 6/2003 | Kim et al. | 345/427 |
| 6,825,839 B2 * | 11/2004 | Huang et al. | 345/423 |
| 6,982,710 B2 * | 1/2006 | Salomie | 345/420 |

(Continued)

FOREIGN PATENT DOCUMENTS

| | | |
|---|---|---|
| KR | 2000-16837 | 3/2000 |
| KR | 2000-16872 | 3/2000 |
| KR | 2004-90009 | 10/2004 |

OTHER PUBLICATIONS

Choe et al, Mesh Compression with Random Accessibility, 2004, pp. 1-6.*

Taubin, Gabriel and Jarek Rossignac, "Geometric Compression Through Topological Surgery", *ACM Transactions on Graphics*, V. 17, No. 2, Apr. 1998, pp. 84-115.

(Continued)

*Primary Examiner* — Phu K Nguyen
(74) *Attorney, Agent, or Firm* — NSIP Law

(57) ABSTRACT

A method and system to compress and decode mesh data with random accessibility in a three-dimensional mesh model, the system to compress mesh data with random accessibility in a three-dimensional mesh model including: a mesh data acquisition unit to acquire mesh data from a three-dimensional mesh model having a plurality of cells; a wire mesh generation unit to generate a wire mesh including a plurality of wire cells by using the mesh data, each wire cell including at least two cells of the plurality of cells; a data structure generation unit to generate wire mesh information on the wire mesh and wire cell data including mesh data of the respective wire cells; and an encoding unit to compress the generated wire mesh information and the generated wire cell data.

44 Claims, 9 Drawing Sheets

(56) References Cited

U.S. PATENT DOCUMENTS

| | | | |
|---|---|---|---|
| 7,224,729 B1* | 5/2007 | Jang et al. | 375/240.08 |
| 7,463,258 B1* | 12/2008 | Drury et al. | 345/423 |
| 7,532,133 B2* | 5/2009 | Ahn et al. | 341/51 |
| 8,014,621 B2* | 9/2011 | Ahn et al. | 382/239 |
| 2003/0099409 A1 | 5/2003 | Rowe | |
| 2006/0109269 A1* | 5/2006 | Jennings et al. | 345/424 |
| 2006/0239543 A1 | 10/2006 | Ahn et al. | |

OTHER PUBLICATIONS

Pajarola, Renato, and Jarek Rossignac, "Compressed Progressive Meshes", *IEEE Transactions on Visualization and Computer Graphics*, V. 6, No. 1, Jan.-Mar. 2000, pp. 79-93.

Lee, Haeyoung, Pierre Alliez and Mathieu Desbrun, "Angle Analyzer: A Triangle Quad Mesh Codec", *EUROGRAPH1CS*, V. 21, No. 3, 2002.

Touma, Costa and Craig Gotsman, "Triangle Mesh Compression".

* cited by examiner

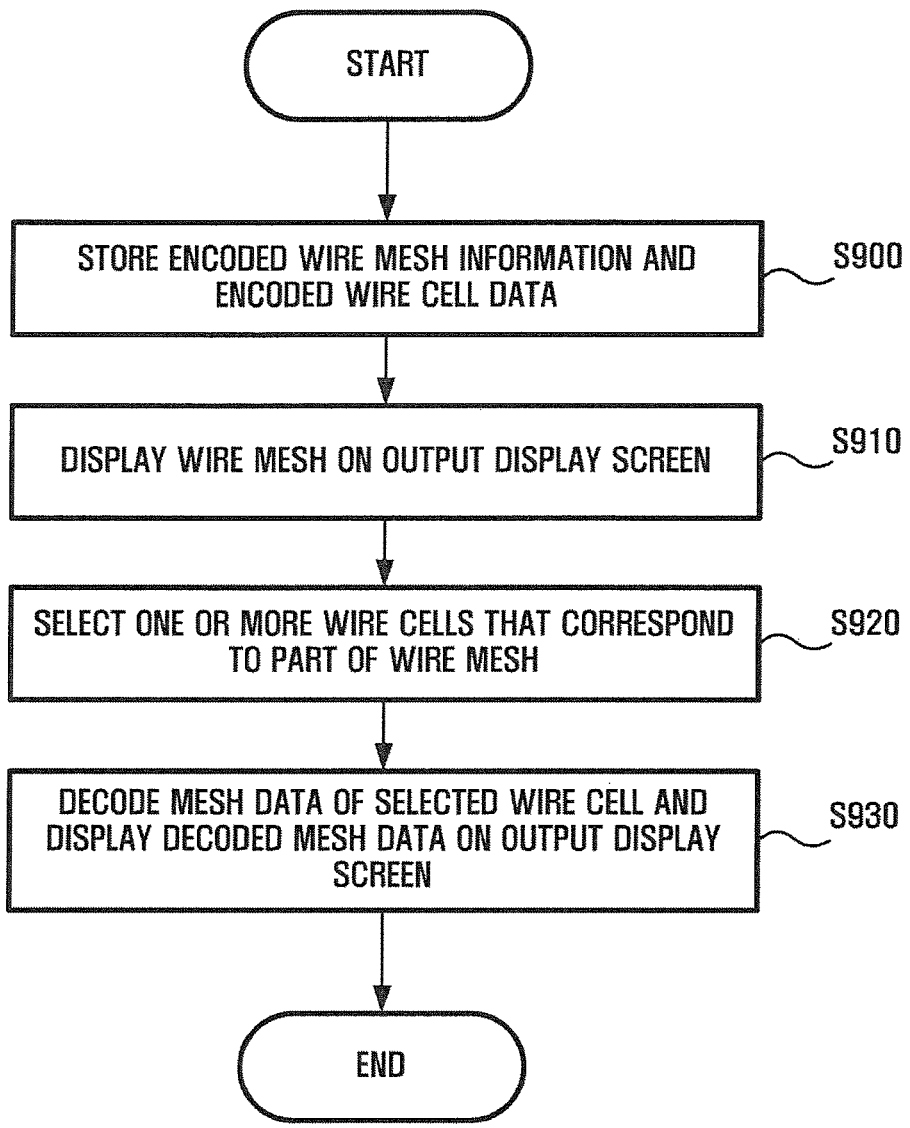

METHOD AND SYSTEM FOR COMPRESSING AND DECODING MESH DATA WITH RANDOM ACCESSIBILITY IN THREE-DIMENSIONAL MESH MODEL

CROSS-REFERENCE TO RELATED APPLICATION

This application claims the benefit of Korean Application No. 2008-6349, filed Jan. 21, 2008 in the Korean Intellectual Property Office, the disclosure of which is incorporated herein by reference.

BACKGROUND OF THE INVENTION

1. Field of the Invention

Aspects of the present invention relate to a method and system to compress and decode mesh data with random accessibility in a three-dimensional mesh model, and more particularly, to a method and system to compress and decode mesh data that performs random access of mesh data in a three-dimensional mesh model.

2. Description of the Related Art

Three-dimensional mesh data processing and displaying technology can be applied to diverse fields (such as CAD (Computer Aided Design), computer graphics, computer games, virtual reality, medical images, etc.) using mesh data including geometry information of vertexes constituting meshes and connectivity information among the vertexes.

Various methods of compressing and decoding such three-dimensional mesh data have been proposed. For example, "G. Taubin and J. Rossignac, *Geometry Compression Through Topological Surgery*, ACM Transactions on Graphics, Vol. 17, No. 2, 84-115p, 1998", "R. Pajarola and J. Rossignac, *Compressed progressive meshes*, IEEE Trans. On Visualization and Computer Graphics vol. 6, pp. 79-93, 2000", and Korean Patent Unexamined Publication No. 2004-0090009 relate to the improvement of a compression rate of three-dimensional mesh data.

On the other hand, there has been an attempt to generate a three-dimensional mesh model by digitizing art work or cultural property and to process the generated three-dimensional mesh model through a graphic processing device. However, as the three-dimensional mesh model for the art work or the cultural property is generated, large-capacity mesh data may be generated in order to express in detail enormous and complicated shapes of the art work or the cultural property.

In addition, since large-capacity mesh data is stored in a memory during processing of the three-dimensional mesh model, overload may result in the system or a problem may occur during processing of the large-capacity mesh data. In addition, according to the existing simple compression of mesh data, mutual dependence exists between the compressed data. Thus, accessing and decoding only a part of the whole compressed data is difficult.

Accordingly, there is a need for a method and system capable of easily accessing and decoding a part of the whole mesh data in a three-dimensional mesh model.

SUMMARY OF THE INVENTION

Aspects of the present invention provide a method and system to compress and decode mesh data with random accessibility in a three-dimensional mesh model. Aspects of the present invention also provide a method and system to compress and decode mesh data, which can roughly show a three-dimensional mesh model and can easily access a part of the three-dimensional mesh model by using a wire mesh.

According to an aspect of the present invention, there is provided a system to compress mesh data with random accessibility in a three-dimensional mesh model, the system including: a mesh data acquisition unit to acquire the mesh data from the three-dimensional mesh model having a plurality of cells; a wire mesh generation unit to generate a wire mesh including a plurality of wire cells by using the mesh data, each wire cell including at least two cells of the plurality of cells; a data structure generation unit to generate wire mesh information on the wire mesh and wire cell data including mesh data of the respective wire cells; and an encoding unit to compress the generated wire mesh information and the generated wire cell data.

According to another aspect of the present invention, there is provided a system to decode mesh data with random accessibility in a three-dimensional mesh model having a plurality of cells, the system including: a data storage unit to store encoded wire mesh information on a wire mesh of the three-dimensional mesh model and encoded wire cell data including mesh data of respective wire cells of the wire mesh; an output unit to decode the wire mesh information and to display the wire mesh on an output display screen; and a wire cell selection unit to select at least one wire cell of the wire mesh in accordance with an input, wherein the output unit decodes corresponding mesh data of the selected at least one wire cell and displays the decoded mesh data on the output display screen, and each wire cell includes at least two cells of the plurality of cells.

According to still another aspect of the present invention, there is provided a method of compressing mesh data with random accessibility in a three-dimensional mesh model, the method including: acquiring the mesh data from the three-dimensional mesh model having a plurality of cells; generating a wire mesh including a plurality of wire cells by using the mesh data, each wire cell including at least two cells of the plurality of cells; generating wire mesh information on the wire mesh and wire cell data including mesh data of the respective wire cells; and compressing the generated wire mesh information and the generated wire cell data.

According to yet another aspect of the present invention, there is provided a method of decoding mesh data with random accessibility in a three-dimensional mesh model having a plurality of cells, the method including: storing encoded wire mesh information on a wire mesh of the three-dimensional mesh model and encoded wire cell data including mesh data of respective wire cells of the wire mesh; decoding the wire mesh information and displaying the wire mesh on an output display screen; selecting at least one wire cell of the wire mesh in accordance with an input; and decoding corresponding mesh data of the selected at least one wire cell and displaying the decoded mesh data on the output display screen, wherein each wire cell includes at least two cells of the plurality of cells.

According to another aspect of the present invention, there is provided a method of decoding mesh data with random accessibility in a three-dimensional mesh model having a plurality of cells, the method including: decoding wire mesh information on a wire mesh of the three-dimensional mesh model; selecting at least one wire cell of the wire mesh in accordance with an input; and decoding corresponding mesh data of the selected at least one wire cell, wherein mesh data of respective wire cells of the wire mesh is included in wire cell data, and each wire cell includes at least two cells of the plurality of cells.

According to still another aspect of the present invention, there is provided a system to process mesh data with random accessibility in a three-dimensional mesh model, the system including: an apparatus to generate a wire mesh, the apparatus to compress including: a mesh data acquisition unit to acquire the mesh data from the three-dimensional mesh model having a plurality of cells, a wire mesh generation unit to generate the wire mesh including a plurality of wire cells by using the mesh data, each wire cell including at least two cells of the plurality of cells, and a data structure generation unit to generate wire mesh information on the wire mesh and wire cell data including mesh data of the respective wire cells; and an apparatus to output the mesh data, the apparatus including: a wire cell selection unit to select at least one wire cell of the wire mesh in accordance with an input, and an output unit to output corresponding mesh data of the selected at least one wire cell.

According to yet another aspect of the present invention, there is provided a system to generate a wire mesh with random accessibility in a three-dimensional mesh model, the system including: a mesh data acquisition unit to acquire mesh data from the three-dimensional mesh model having a plurality of cells; a wire mesh generation unit to generate the wire mesh including a plurality of wire cells by using the mesh data, each wire cell including at least two cells of the plurality of cells; and a data structure generation unit to generate wire mesh information on the wire mesh and wire cell data including mesh data of the respective wire cells.

According to another aspect of the present invention, there is provided a method of processing mesh data with random accessibility in a three-dimensional mesh model, the method including: acquiring the mesh data from the three-dimensional mesh model having a plurality of cells; generating a wire mesh including a plurality of wire cells by using the mesh data, each wire cell including at least two cells of the plurality of cells; generating wire mesh information on the wire mesh and wire cell data including mesh data of the respective wire cells; selecting at least one wire cell of the wire mesh; and outputting corresponding mesh data of the selected at least one wire cell.

According to another aspect of the present invention, there is provided a method of generating a wire mesh with random accessibility in a three-dimensional mesh model, the method including: acquiring mesh data from the three-dimensional mesh model having a plurality of cells; generating the wire mesh including a plurality of wire cells by using the mesh data, each wire cell including at least two cells of the plurality of cells; and generating wire mesh information on the wire mesh and wire cell data including mesh data of the respective wire cells.

According to another aspect of the present invention, there is provided a computer-readable recording medium implemented by at least one computer to render a wire mesh of a three-dimensional mesh model including a plurality of wire cells that each include at least two cells of a plurality of cells defining at least one surface of the model, the medium including: wire mesh information on the wire mesh, the wire mesh information including: wire information to indicate boundaries of the respective wire cells, and wire cell identifiers; and wire cell data including mesh data of the respective wire cells, wherein the at least one computer uses the wire cell identifiers to identify the corresponding mesh data of the respective wire cells, uses the wire mesh information to display the wire mesh on an output display screen, and uses corresponding mesh data of at least one selected wire cell, according to the wire cell identifiers, to display the at least one selected wire cell on the output display screen.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will be apparent and more readily appreciated from the following description of the embodiments, taken in conjunction with the accompanying drawings of which:

FIG. 9 is a flowchart illustrating a method of decoding mesh data with random accessibility in a three-dimensional mesh model according to an embodiment of the present invention.

DETAILED DESCRIPTION OF THE EMBODIMENTS

Figure 1:
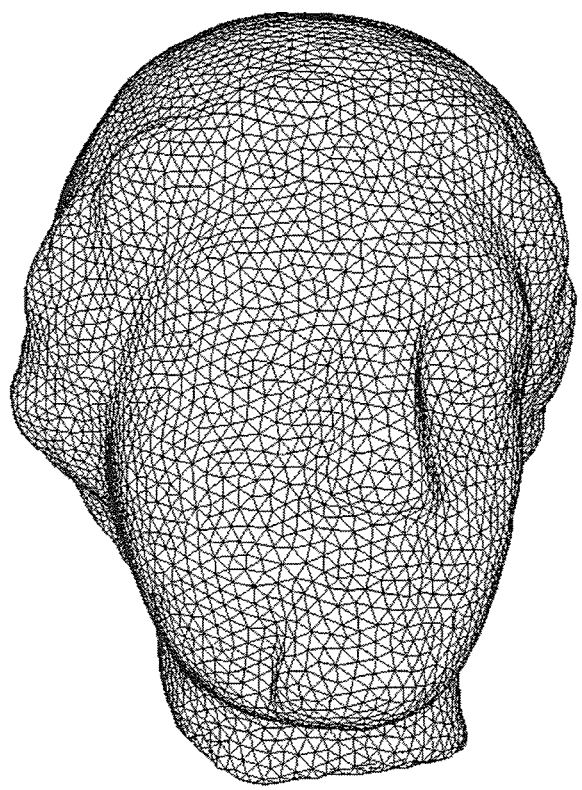
FIG. 1 is a view illustrating an example of mesh generation in a general three-dimensional model.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Also, aspects of the present invention will be described herein with reference to the accompanying drawings illustrating block diagrams and flowcharts to explain a method and system for compressing and decoding mesh data with random accessibility in a three-dimensional mesh model according to embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create methods and/or devices to implement the operations specified in the flowchart block or blocks. These computer program instructions may also be stored in a computer-usable or computer-readable memory that can direct a computer or other programmable data processing apparatus to operate in a particular manner, such that the instructions stored in the computer-usable or computer-readable memory produce an article of manufacture including instruction methods and/or devices that implement the operation specified in the flowchart block or blocks. Examples of the computer-readable medium include read-only memory (ROM), random-access memory (RAM), CD-ROMs, magnetic tapes, floppy disks, and optical data storage devices. The computer-readable medium can also be distributed over network-coupled computer systems so that the computer-readable code is stored and executed in a distributed fashion. The computer program instructions may also be realized in a data signal embodied in a carrier wave and comprising the computer program instructions readable by a computer and transmittable over the Internet. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the operations specified in the flowchart block or blocks. Also, each block of the flowchart illustrations may represent a module, segment, or portion of code, which comprises one or more executable instructions for implementing the specified logical operation(s). It should also be noted that in some alternative implementations, the operations noted in the blocks may occur out of the order. For example, two blocks shown in succession may in fact be executed substantially concurrently or the blocks may sometimes be executed in the reverse order, depending upon the operation involved.

In the embodiments of the present invention, the term "unit", as used herein, may be implemented as a kind of module. Here, the term "module" means, but is not limited to, a software or hardware component, such as a Field Programmable Gate Array (FPGA) or Application Specific Integrated Circuit (ASIC), which performs certain tasks. A module may be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

FIG. 1 is a view illustrating an example of mesh generation in a general three-dimensional model. Referring to FIG. 1, a three-dimensional mesh model is generated with respect to a three-dimensionally modeled character shape. A polygonal mesh model is generated with respect to a face forming a surface of the three-dimensional character shape. The three-dimensional mesh model is expressed by mesh data. The mesh data, for example, includes geometry information of vertexes of the three-dimensional mesh model. Furthermore, the three-dimensional mesh model includes a plurality of cells. Here, the cell has a closed structure including faces, vertexes, and edges. For example, the cell may be in the form of a triangle, a tetragon, a pentagon, etc. Accordingly, the three-dimensional mesh model is provided with several tens to several ten thousands of cells, each having a face in the form of a shape, such as a triangle, a tetragon, a pentagon, a hexagon, etc. Once the size and/or the area of the cell is given, several tens to several ten thousands of cells are automatically formed in accordance with a modeled shape of the three-dimensional mesh model. In generating the cells, various techniques already known in the field of modeling a three-dimensional shape may be used.

Figure 2:
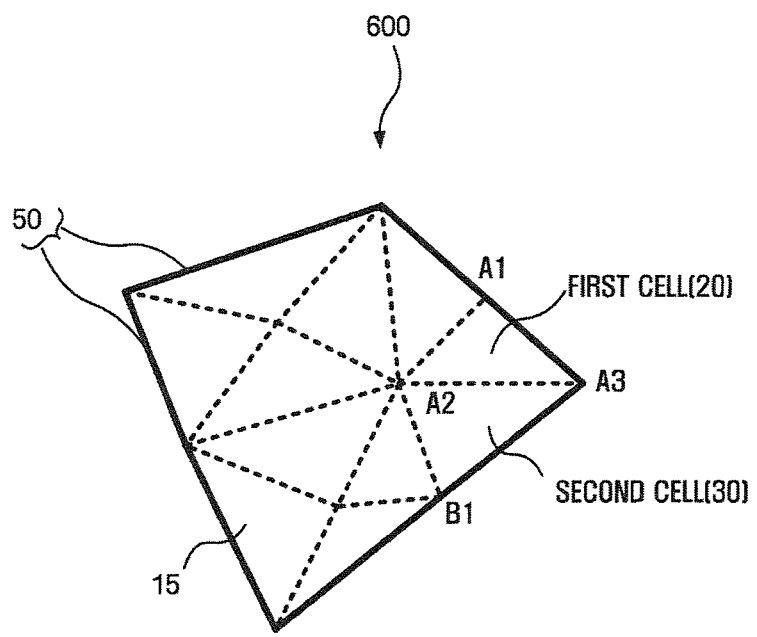
FIG. 2 is a view illustrating a wire cell in a system to compress and decode mesh data with random accessibility in a three-dimensional mesh model according to an embodiment of the present invention.

FIG. 2 is a view illustrating a wire cell 600 in a system to compress and decode mesh data with random accessibility in a three-dimensional mesh model according to an embodiment of the present invention. Referring to FIG. 2, the three-dimensional mesh model can be expressed by positions of vertexes of the three-dimensional mesh model or cell information of the three-dimensional mesh model, which correspond to mesh data. Here, the cell information includes information capable of expressing a cell 15 including faces, vertexes, and edges. For example, the cell information includes coordinates of respective vertexes for one mesh. Accordingly, if the coordinates of the respective vertexes are known, the three-dimensional mesh model can be displayed on a display screen from different viewpoints with reference to the coordinates of the respective vertexes. Geometry information of the respective vertexes and connectivity information among the respective vertexes may be used as the mesh data. In addition, the geometry information of the vertexes may be called vertex data. Another example of the mesh data includes geometry information of the respective cells 15. For example, a first cell 20 includes vertexes A1, A2, and A3, and a second cell 30 includes vertexes B1, A2, and A3. Here, the order of the vertexes may be designated clockwise or counterclockwise in accordance with a counting order.

In the three-dimensional mesh model as described above, as the number of cells becomes larger, the amount of mesh data is increased in geometrical series. Since the reading and processing of the whole mesh data representing the three-dimensional mesh model requires a large-capacity memory and a large-scale operation, overload may be generated in the system processing the three-dimensional mesh model. On the other hand, if image processing or shape modeling with respect to only a part of the three-dimensional shape is to be performed, a scheme for processing and outputting only a part selected from the three-dimensional shape on the output display screen is required.

Accordingly, in an embodiment of the present invention, the wire cell 600 that roughly expresses the three-dimensional mesh model is used to allow random access to a part of the three-dimensional mesh model. The wire cell 600, as shown in FIG. 2, is generated by a set of cells 15, 20, and 30, and an area is formed by combining the cells 15, 20, and 30. The shown boundaries of the wire cell 600 have straight lines, called wires 50. Accordingly, aspects of the present invention provide wire cells 600 in a wire mesh, such that it is possible to allow random access to a part of the three-dimensional mesh model. However, it is understood that the wires 50 can have other shapes and need not be straight sides in all aspects.

Figure 3:
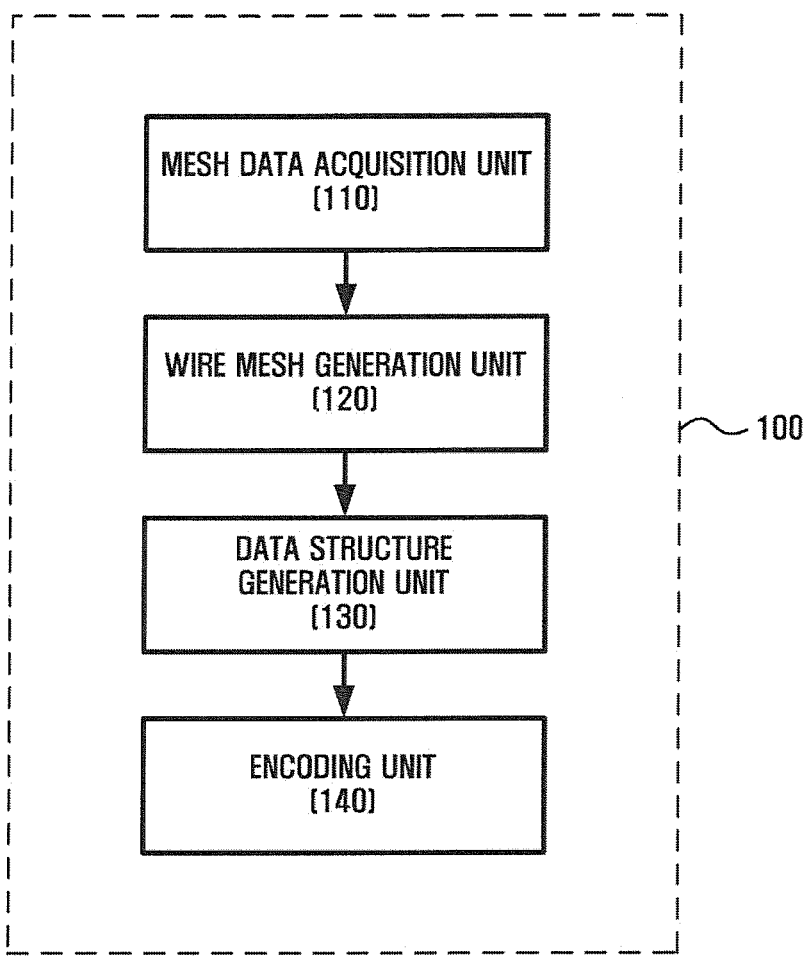
FIG. 3 is a block diagram illustrating a configuration of a system to compress mesh data with random accessibility in a three-dimensional mesh model according to an embodiment of the present invention.

FIG. 3 is a block diagram illustrating a configuration of a system 100 to compress mesh data with random accessibility in a three-dimensional mesh model according to an embodiment of the present invention. Referring to FIG. 3, the system 100 to compress mesh data with random accessibility in a three-dimensional mesh model includes a mesh data acquisition unit 110, a wire mesh generation unit 120, a data structure generation unit 130, and a data encoding unit 140.

The mesh data acquisition unit 110 acquires mesh data from the three-dimensional mesh model. For instance, the mesh data can be acquired using a camera which digitizes the physical object. Alternatively, the mesh data acquisition unit 110 reads and acquires mesh data stored in a memory (not illustrated). The memory may be external or internal, and may be a volatile memory (such as RAM) or a non-volatile memory (such as ROM, flash memory, or a hard disk drive). Here, the mesh data includes positions of vertexes (i.e., geometry information of vertexes) generated from the three-dimensional mesh model. The shape of the whole three-dimensional mesh model is expressed by using the positions of the respective vertexes as values expressed in an absolute coordinate system.

The mesh data acquisition unit 110 acquires the mesh data of the respective meshes by generating a three-dimensional mesh model through a three-dimensional scanning method, or acquires the mesh data from the three-dimensional mesh model generated based on the three-dimensional modeling.

The wire mesh generation unit 120 generates wire meshes by using the acquired mesh data. Here, the wire mesh is a mesh obtained by dividing the three-dimensional mesh model into a plurality of wire cells 600. The wire mesh includes a plurality of wire cells 600, and roughly expresses the three-dimensional shape of the three-dimensional mesh model. The wire cell 600 is a cell generated by a set of neighboring cells 15, 20, and 30. Accordingly, the wire mesh is a mesh model capable of roughly expressing the three-dimensional mesh model, and can express the three-dimensional shape by wire cells 600 that are sparser than cells 15, 20, and 30 within each cell 600. Since the wire cell 600 is processed as a unit, the three-dimensional mesh model is expressed by using a relatively small number of cells. If a wire cell 600 is selected, only the mesh data included in the corresponding wire cell 600 is processed. Accordingly, mesh data of a large capacity is not required to be stored on a memory of a system, and a user can access only a desired part of the three-dimensional mesh model through the wire mesh. Thus, even a low-end system can be used to process the mesh data without an overload.

As described above, the wire cell 600 is a set of cells 15, 20, and 30 that neighbor one another and can be recognized as a segment among a plurality of cells of the three-dimensional mesh model. Also, the wire cell 600 can neighbor another wire cell 600 along a plurality of edges. According to aspects of the present invention, by compressing and decoding the mesh data in the unit of a wire cell 600, it is possible to allow random access to a part of the three-dimensional mesh model. Here, the part of the three-dimensional mesh model corresponds to at least one wire cell 600. That is, through the wire cell 600, a part of the mesh data in the three-dimensional mesh model can be accessed and decoded.

The wire cell 600 is externally treated as an independent unit for data compression and decoding, and internally includes mesh data of a plurality of neighboring cells 15, 20, and 30 in the three-dimensional mesh model. Accordingly, the wire cell 600 may be seen as an independent unit by a user, but may internally include mesh data (e.g., geometry information of vertexes) in the boundaries of the wire cell 600.

The wire cell 600 may be generated such that the shape of the wire cell 600 is made, as much as possible, to be a plane. If the shape of the wire cell 600 is close to a plane, the positions of the respective vertexes of the wire cell 600 can be easily predicted and, as a result, a high compression rate can be achieved. Accordingly, the wire cell 600 may be generated by lowering the evenness (i.e., a degree of similarity to a plane) of the wire cell 600 to below a threshold value. Since the wire cell 600 is a set of neighboring cells 15, 20, and 30 among the plurality of cells of the three-dimensional mesh model, the size and/or shape of the wire cell 600 can be adjusted by adjusting the set of cells 15, 20, and 30.

Furthermore, the shapes of boundaries of the wire cell 600 may be made to be as simple as possible. The wire cell 600 is a set of neighboring cells 15, 20, and 30 such that if the boundaries are complicated (for example, in a zigzag), a much larger amount of data to store the boundary information is required to lower the compression rate. Accordingly, the wire cell 600 can be adjusted so that the lengths of the boundaries of the wire cell are minimized with the condition that the number of neighboring cells 15, 20, and 30 included in the wire cell 600 is larger than a threshold number. For example, the length of the boundaries of the wire cell 600 can be minimized by minimizing the number of vertexes included in the boundaries of the wire cell 600 in a state that the number of cells 15, 20, and 30 is larger than the threshold number.

Moreover, a number of cells 15, 20, and 30 of the wire cell 600 may be constant. If a random access to the wire cell 600 is possible, a decoding time differs in accordance with the number of cells 15, 20, and 30 included in the respective wire cells 600. Accordingly, by making the number of cells 15, 20, and 30 included in the respective wire cells 600 constant, the decoding of the wire cell 600 is performed within a specified time. Thus, the efficiency of random access is heightened. While described in terms of three cells 15, 20, and 30 per wire cell 600, it is understood that other numbers can be used or set by a user.

As described above, a wire cell 600 including a plurality of neighboring cells 15, 20, and 30 is generated, and the totality of wire cells 600 is a wire mesh. In generating the wire cell 600, the three-dimensional mesh model is divided into a plurality of independent wire cells 600. Accordingly, through the wire cells 600 generated for the three-dimensional mesh model, random access to the mesh data of the three-dimensional mesh model can be performed in the unit of a wire cell 600.

The data structure generation unit 130 generates wire mesh information on the generated wire mesh 600 and wire cell data including the mesh data of the respective wire cells 600. The data structure generation unit 130 generates the wire mesh information that is ancillary information so as to make it possible to access the mesh data of the three-dimensional mesh model in the unit of a wire cell 600. Furthermore, the data structure generation unit 130 generates the wire cell data by classifying the mesh data of the three-dimensional mesh model in the unit of a wire cell 600. The wire mesh information and the wire cell data will be described in detail later.

The encoding unit 140 compresses the wire mesh information and the wire cell data generated by the data structure generation unit 130. The data can be compressed by applying existing mesh encoding techniques thereto. In order to compress the wire cell data, various known mesh data compression techniques may be used, such as "T. Touma and C. Gotsman, *Triangle mesh compression*, Proc. Graphics Interface '98, pp. 26-34, 1998" and "H. Lee, P. Alliez, and M. Desbrun, *Angle analyzer A triangle-quad mesh codec*, Computer Graphics Forum (Proc, Eurographics 2002), pp. 383-392, 2002," The disclosures of which are incorporated by reference. For example, in order to compress the positions of vertexes included in the wire cell data, a parallelogram prediction technique and/or a local frame encoding technique may be used.

As described above, according to aspects of the present invention, random access to a part of a three-dimensional mesh model is possible through a wire mesh. Also, by generating wire cells 600, the three-dimensional mesh model can be externally accessed in the unit of a wire cell 600, and the respective wire cells 600 can be internally stored. Accordingly, mutual dependence between the mesh data in the three-dimensional mesh model is reduced, and the random accessibility to an area is increased.

Figure 4:
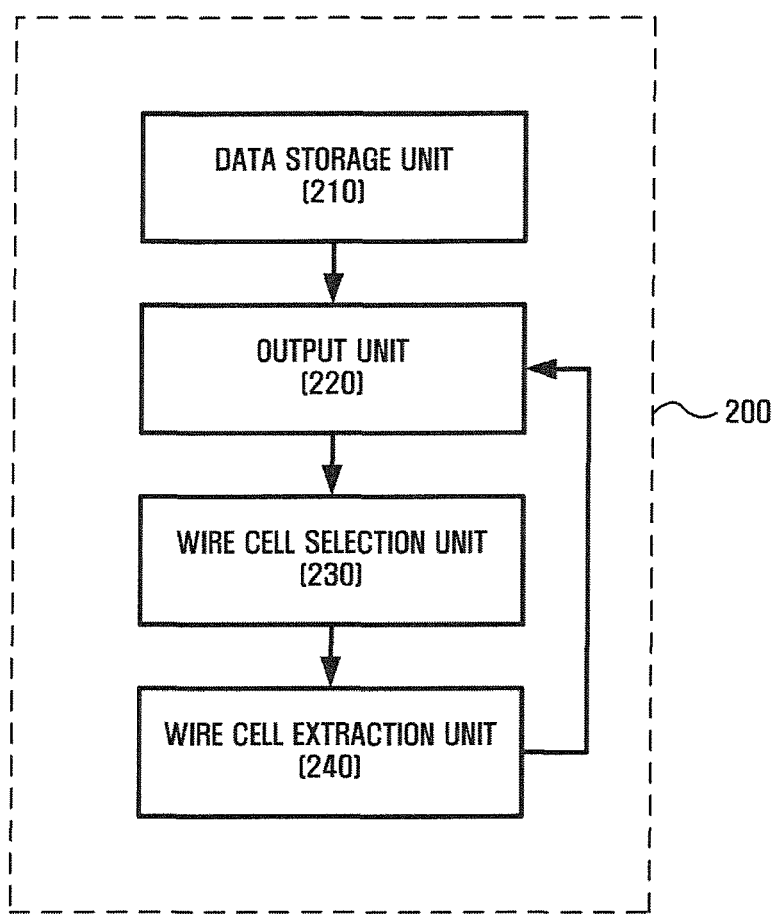
FIG. 4 is a block diagram illustrating a configuration of a system to decode mesh data with random accessibility in a three-dimensional mesh model according to an embodiment of the present invention.

FIG. 4 is a block diagram illustrating a configuration of a system 200 to decode mesh data with random accessibility in a three-dimensional mesh model according to an embodiment of the present invention. While embodiments of the present invention provide a system to compress the mesh data and a system to decode the mesh data, it is understood that according to other embodiments, one system may be provided to compress and decode the mesh data. Referring to FIG. 4, the system 200 includes a data storage unit 210, an output unit 220, a wire cell selection unit 230, and a wire cell extraction unit 240.

The data storage unit 210 stores encoded wire mesh information and encoded wire cell data. The storage unit 210 can be optical and/or magnetic storage media, such as a hard drive, optical disc, etc. The wire mesh information and the wire cell data may be data transmitted through a wired and/or wireless network or through other wired and/or wireless communication methods (such as infrared, PCI or other internal connection methods, Bluetooth, etc.). The wire mesh information includes information on wire cells 600 that roughly express the three-dimensional mesh model. The wire mesh information includes wire information indicating the respective wire cells 600 and identifiers identifying the wire cell data for the respective wire cells. Also, the wire mesh information includes information on storage addresses of the wire cell data stored in the data storage unit 210 in the unit of a wire cell 600. The data storage unit 210 can be detachable, such as where the unit 210 connects via a disc drive or USB type interface.

The output unit 220 displays the wire mesh on an output display screen (such as on a connected display or a display integral to the system 200) by using the stored encoded wire mesh information. The wire mesh is a mesh system including a plurality of wire cells 600 that roughly express the three-dimensional mesh model. Accordingly, as the output unit outputs the wire mesh including the plurality of wire cells 600, the three-dimensional mesh model can be displayed by using a relatively small amount of data in comparison to all available mesh data. Furthermore, if a specified wire cell 600 is selected from a wire mesh, such as through a user's input, the output unit 220 reads wire cell data of the selected wire cell 600 from the data storage unit 210, and displays the wire cell 600 on the output display screen. The output unit 220 may enlarge the selected wire cell to be displayed on the output display screen, so that the user can see a part of the three-dimensional mesh model in more detail.

The wire cell selection unit 230 receives an external input from a user, and selects at least one wire cell 600 from the wire mesh. That is, if an external input to select a part of the three-dimensional mesh model is received, the wire cell selection unit 230 selects at least one wire cell 600 corresponding to the part of the three-dimensional mesh model. The external input is an input by the user to select a part of the wire mesh through an input device (such as a mouse, a keyboard, a pen, etc.). Furthermore, the input device may be coupled to the output display screen (such as a touch screen).

The wire cell extraction unit 240 extracts only data of the at least one selected wire cell 600 among wire cell data stored in the data storage unit 210 by using the wire mesh information. Accordingly, the wire mesh information includes identifiers to identifying data of the respective wire cells 600, or address information corresponding to a storage of the respective wire cells 600.

Figure 5:
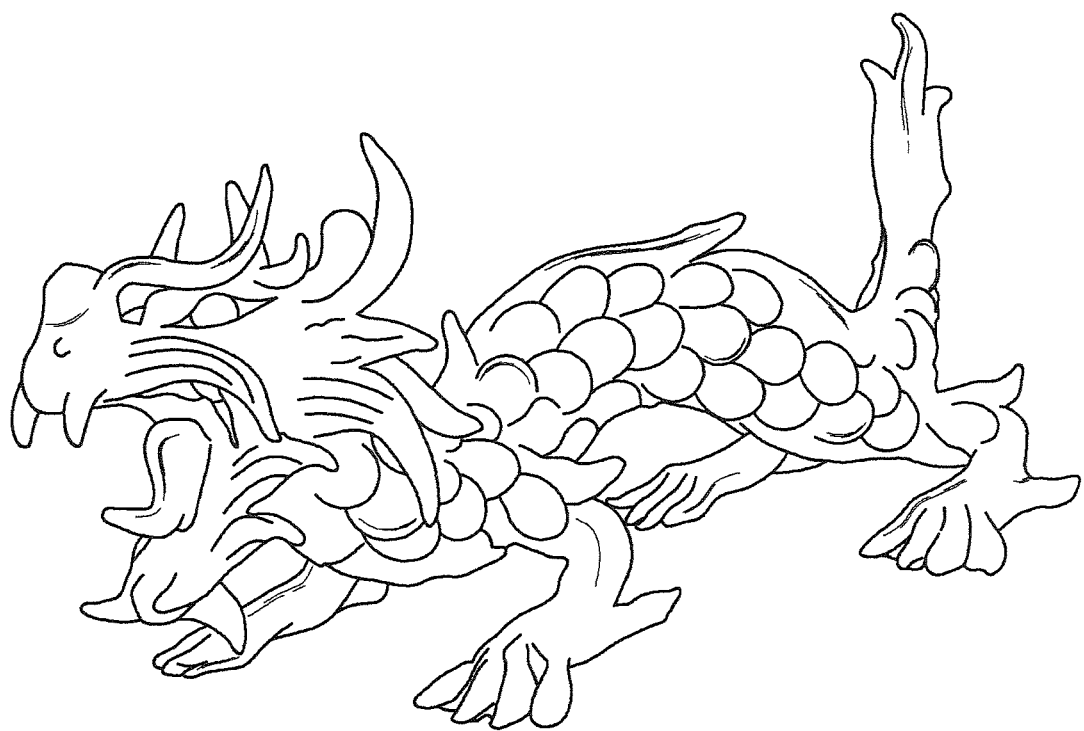
FIG. 5 is a view illustrating a three-dimensional mesh model applied according to an embodiment of the present invention.
Figure 6:
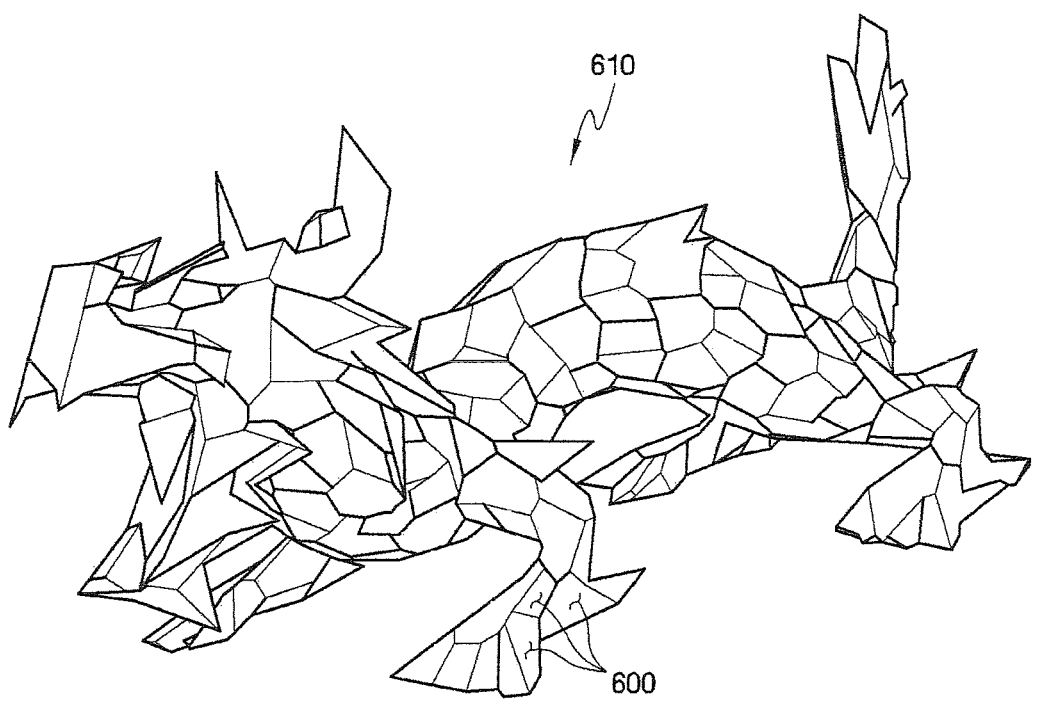
FIG. 6 is a view illustrating a wire mesh generated by applying a system to compress and decode mesh data with random accessibility in the three-dimensional mesh model of FIG. 5 according to an embodiment of the present invention.

FIG. 5 is a view illustrating a three-dimensional mesh model applied according to an embodiment of the present invention, and FIG. 6 is a view illustrating a wire mesh generated by applying the systems 100, 200 to compress and decode mesh data with random accessibility in the three-dimensional mesh model of FIG. 5 according to an embodiment of the present invention. Referring to FIG. 5, as an example, aspects of the present invention are applied to a three-dimensional dragon shape. A three-dimensional mesh model is generated by three-dimensional modeling, and then rendering is performed with respect to the generated mesh model. Although a plurality of cells are not shown in the three-dimensional mesh model, the dragon shape internally corresponds to the three-dimensional mesh model composed of several tens to several ten thousands of cells.

Referring to FIG. 6, a wire mesh 610 formed from the three-dimensional mesh model of FIG. 5 is shown. The wire mesh 610 includes a plurality of wire cells 600, of which boundaries are processed to be smooth. Thus, the wire mesh 610 is not completely equal to the three-dimensional mesh model of FIG. 5, but roughly expresses the three-dimensional mesh model of FIG. 5. As described above, by introducing the wire cell 600 that is a set of cells 15, 20 and 30 in the three-dimensional mesh model and outputting the wire mesh 610 including a plurality of wire cells 600, a large-capacity three-dimensional mesh model can be roughly shown with a relatively small amount of data. Accordingly, in an aspect of the present invention, the user can select a part of the wire mesh 610. When the part of the wire mesh 610 is selected, at least one wire cell 600 that belongs to the selected part is shown in detail. In other words, the mesh data describing geometry information of vertexes existing in the boundaries of the wire cell 600 is read from the data storage unit 210 and outputted through the output display screen such that all mesh data is used only for the selected wire cell 600, but is not used for the remaining unselected wire cells 600. As a result, the three-dimensional mesh model of the selected part can be displayed in detail on the screen.

Figure 7:
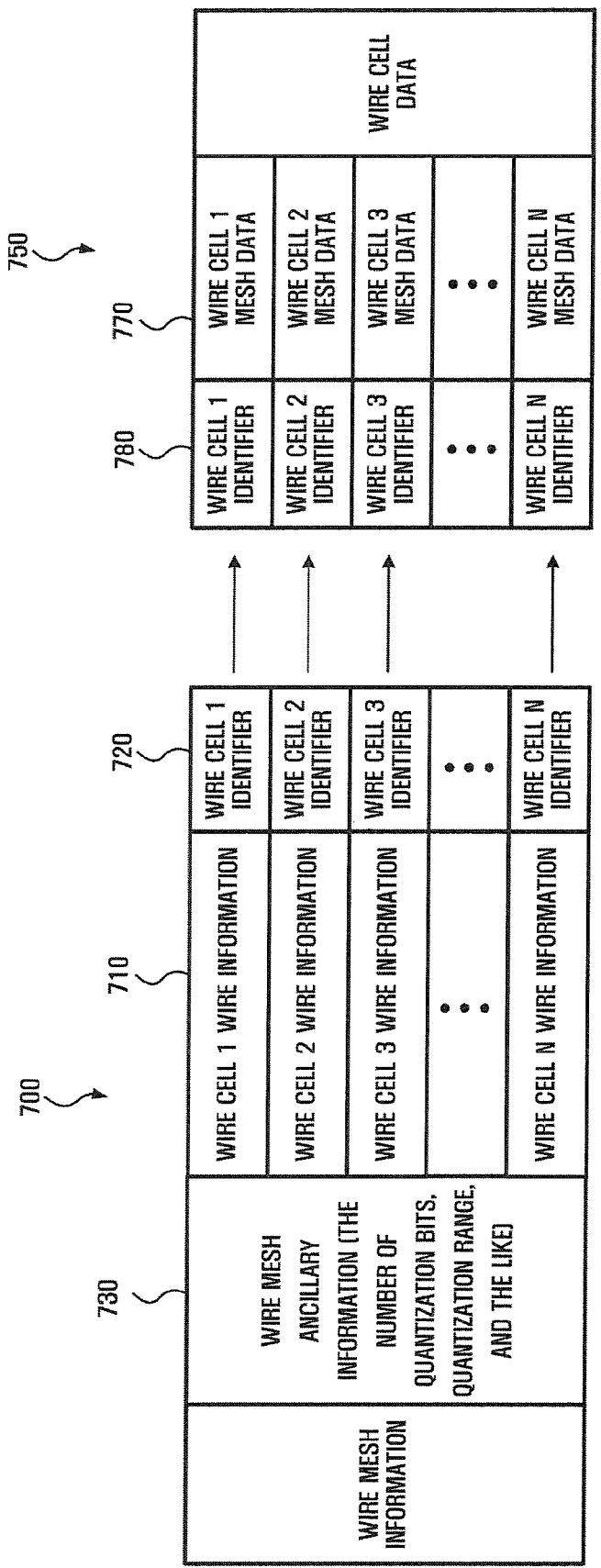
FIG. 7 is a view illustrating a simple data structure of wire mesh information and wire cell data in a system to compress and decode mesh data with random accessibility in a three-dimensional mesh model according to an embodiment of the present invention.

FIG. 7 is a view illustrating a simple data structure of wire mesh information 700 and wire cell data 750 in the systems 100, 200 to compress and decode mesh data with random accessibility in a three-dimensional mesh model according to an embodiment of the present invention. Referring to FIG. 7, wire mesh information 700 includes information on wire cells 600 in order to express a three-dimensional mesh model by using the wire cells 600. Accordingly, the wire mesh information 700 includes wire information 710 indicating outlines of the wire cells 600. For example, the wire information 710 includes geometry information of two points that are selected with respect to neighboring wires of the respective wire cell 600 and connected together by a straight line called a wire. Accordingly, wires of the wire cell 600 are determined in accordance with the number of neighboring wire cells. For example, if there are four neighboring wire cells around a specified wire cell 600, the specified wire cell 600 is expressed by four wires, and the wire mesh information 700 includes wire information 710 on the four wires. Moreover, the wire mesh information 700 includes a number of quantization bits and a quantization range, which are used when the wire cell data 750 is quantized and stored, as ancillary information 730. This ancillary information 730 may be included in the wire mesh information 700 or in the wire cell data 750.

The wire mesh information 700 can simply indicate the three-dimensional mesh model by using the wire information 710 on the respective wire cells 600. Accordingly, the whole mesh data of the three-dimensional mesh model is not read, but the wire mesh information 700 is read to simply express the three-dimensional mesh model. Also, the wire mesh information 700 includes identifiers 720 to identify the wire cell data 750 in the unit of a wire cell 600 and/or addresses of a storage unit in which mesh data 770 of the respective wire cells 600 in the wire cell data 750 are stored. Alternatively or additionally, the identifier 720 may be an encrypted code and/or an agreed codeword that can discriminate among the mesh data 770 of the respective wire cells in the wire cell data 750.

The wire cell data 750 includes the mesh data 770 of the respective wire cells 600. The mesh data of the respective wire cells 600 includes mesh data of a plurality of cells 15, 20 and 30 included in the respective wire cells 600 (e.g., geometry information of vertexes included in the respective wire cells 600). Accordingly, each wire cell 600 is stored as an independent unit in accordance with the mesh data 770 of the respective wire cell 600. At this time, identifiers 780 may be located in header parts of the mesh data 770 of the respective wire cells or can be separately disposed in the data 750 as shown. As described above, by using a data structure in which mesh data 770 of the respective wire cells 600 are separated in an independent unit, random access to the mesh data 770 in the three-dimensional mesh model can be performed in the unit of a wire cell 600.

Figure 8:
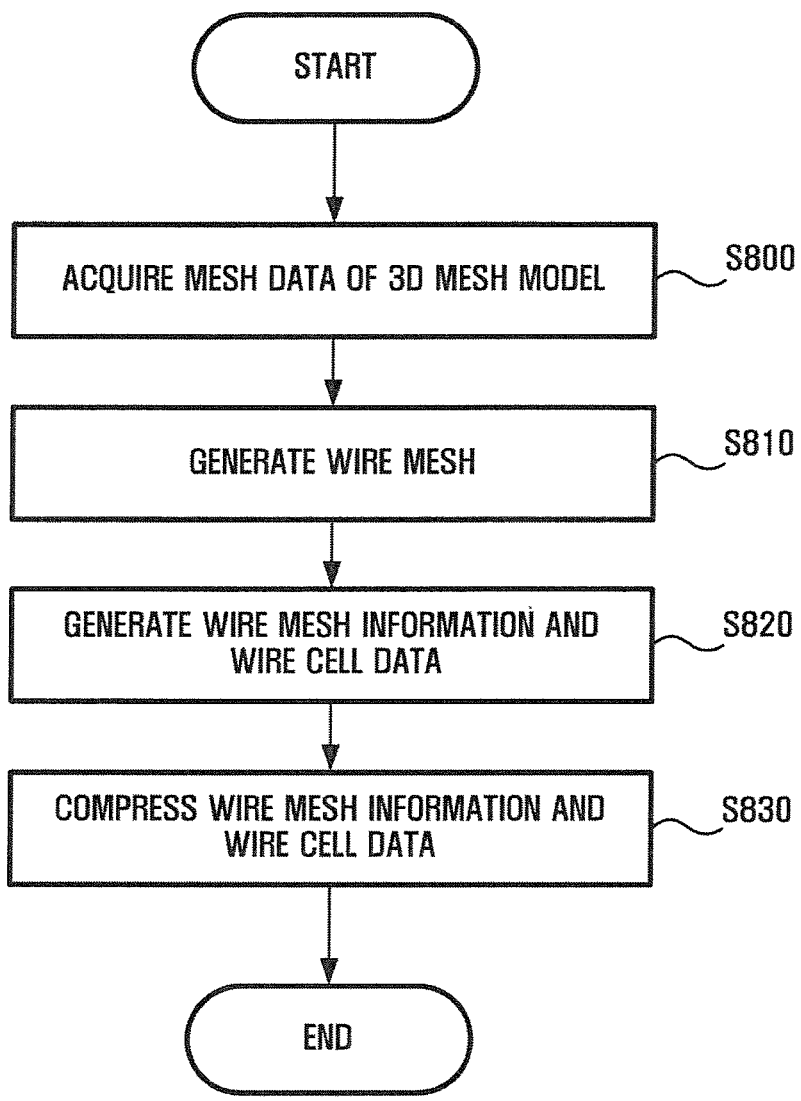
FIG. 8 is a flowchart illustrating a method of compressing mesh data with random accessibility in a three-dimensional mesh model according to an embodiment of the present invention.

FIG. 8 is a flowchart illustrating a method of compressing mesh data with random accessibility in a three-dimensional mesh model according to an embodiment of the present invention. Referring to FIG. 8, mesh data is acquired from a three-dimensional mesh model in operation S800. The mesh data is data that expresses the three-dimensional mesh model, and includes, for example, geometry information of vertexes A1, A2, A3, B1, . . . and connectivity information constituting the respective cells 15, 20 and 30 using the example in FIG. 2.

When the mesh data is acquired, the wire mesh 610 that expresses the three-dimension mesh model more simply by using the mesh data is generated in operation S810. The wire mesh 610 includes a plurality of wire cells 600. The wire cell 600 is a cell formed by a set of neighboring cells 15, 20 and 30 among cells of the three-dimensional mesh model. The wire cell 600 may be generated such that the shape of the wire cell 600 is made, as much as possible, to be a plane. Furthermore, the shapes of boundaries of the wire cell 600 may be made to be as simple as possible. Also, the number of cells 15, 20 and 30 of the wire cell 600 may be constant for all wire cells 600. By generating wire cells 600, a plurality of cells generated by several hundreds to several ten thousands of vertexes in the three-dimensional mesh model can be simplified into wire cells 600.

The wire mesh information 700 and the wire cell data 750 for the wire mesh 610 are generated in operation S820. The wire mesh information 700 includes wire information 710 corresponding to boundaries of the wire cells 600 so as to roughly express the three dimensional mesh model. Also, the wire mesh information 700 includes addresses in which data of the respective wire cells 600 is stored or identifiers 720 to identify data of the respective wire cells 600 so as to selectively load the data of the respective wire cells 600 from the wire cell data 750. The wire cell data 750 is data of the respective wire cells 600 in units of the wire cell 600. The wire cell data 750 is mesh data obtained by classifying the mesh data 770 of the three-dimensional mesh model by units of wire cells 600.

The generated wire mesh information 700 and wire cell data 750 are compressed in operation S830. The data compression is performed by using general mesh data compression techniques, and the compressed data is stored in a storage medium (not illustrated) or transmitted.

As described above, by introducing the wire mesh 610 for roughly expressing the three-dimensional mesh model, the capacity (i.e., size) of the mesh model can be reduced. Also, by compressing the mesh data 770 of the three-dimensional mesh model in the unit of a wire cell 600, a part of the three-dimensional mesh model can be accessed by wire cells 600. Accordingly, even without reading the whole mesh data 770 of the three-dimensional mesh model, a part of the three-dimensional mesh model can be accessed.

FIG. 9 is a flowchart illustrating a method of decoding mesh data with random accessibility in a three-dimensional mesh model according to an embodiment of the present invention. Referring to FIG. 9, wire mesh information 700 and wire cell data 750 are stored in operation S900. The wire mesh information 700 and the wire cell data 750 may be received wiredly or wirelessly, and may be stored in a volatile memory that is a temporary storage device. Also, the stored data may be pre-encoded information to be decoded. It is noted that the operation S900 need not be performed in all aspects, such as where the mesh data was previously stored on a recording medium connected to the system By using the stored wire mesh information, the wire mesh 610 is displayed on an output display screen in operation S910. Since the wire mesh information 700 includes the wire information 710 indicating boundary lines of the respective wire cells 600, the encoded wire mesh information 700 (if encoded) is decoded and the wire mesh 610 is displayed on the output display screen. By using the wire mesh 610, the three-dimensional mesh model can be roughly expressed on the output display screen without reading the mesh data of the three-dimensional mesh model.

One or more wire cells 600 are selected from the wire mesh 610 outputted through the output display screen in operation S920. A part of the wire mesh 610 corresponds to the one or more wire cells 600. Accordingly, if a part of the wire mesh is selected by a user's input or by an external input, one or more wire cells 600 are selected. The one or more selected wire cells 600 may be an area to be observed in detail by the user.

When the one or more wire cells 600 are selected, the wire cell data 750 corresponding to the selected one or more wire cells 600 is decoded (if encoded) and displayed on the output display screen in operation S930. In an embodiment of the present invention, if one or more wire cells 600 that correspond to a part of the wire mesh 610 are selected, the mesh data 770 of the three-dimensional mesh model corresponding to the selected wire cell 600 is read from the data storage unit 210, and displayed on the output display screen. Accordingly, when one or more wire cells 600 are selected, data of the corresponding wire cells 600 is searched and extracted from the wire cell data 770 stored in the data storage unit 210. At this time, by using the wire mesh information 700 including the storage addresses in which data of the respective wire cells 600 is stored or identifiers 720 to identify data of the respective wire cells 600, the wire cell data 750 stored in the data storage unit 210 can be read. As such, greater detail is provided for the selected wire cells 600 by rendering the cells constituting the selected wire cells 600.

As described above, aspects of the present invention provide a wire mesh 610 allowing random access to a part of a three-dimensional mesh model. By independently and separately compressing the mesh data 770 of the three-dimensional mesh model in the unit of a wire cell 600, a part of the three-dimensional mesh model can be easily accessed and decoded. Furthermore, according to aspects of the present invention, since it is possible to allow random access to a part of the three-dimensional mesh model, even a low-end device or a portable device (such as a mobile phone, a laptop or portable computer, a personal computer, a personal digital assistant, etc.) can be used to process the three-dimensional mesh model. Also, by introducing the wire mesh 610, the three-dimensional mesh model can be roughly viewed to heighten the accessibility to the three-dimensional mesh model. In addition, by reducing the mutual dependence between the mesh data 770 in the three-dimensional mesh model, specific mesh data can be selectively accessed and decoded.

While described in terms of acquiring mesh models of cultural artifacts, it is understood that aspects could be used in other forms of computer modeling of objects, such as for animation, architectural and engineering drawings, medical imaging, or other computer-based mechanisms for rendering surfaces of physical objects.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A system to compress mesh data with random accessibility in a three-dimensional mesh model, the system comprising:
    a mesh data acquisition unit to acquire the mesh data from the three-dimensional mesh model having a plurality of cells defining at least one surface of the model;
    a wire mesh generation unit to generate a wire mesh including a plurality of wire cells by using the mesh data, each wire cell including at least two cells of the plurality of cells;
    a data structure generation unit to generate wire mesh information on the wire mesh and wire cell data including mesh data of the respective wire cells; and
    an encoding unit to compress the generated wire mesh information and the generated wire cell data, wherein:
    the wire mesh information comprises positions in a storage unit in which the corresponding mesh data of the respective wire cells is stored, and
    each cell is in the form of a polygon.

2. The system as claimed in claim 1, wherein the wire mesh information comprises wire information to indicate boundaries of the respective wire cells.

3. The system as claimed in claim 1, wherein the wire mesh information comprises identifiers to identify the corresponding mesh data of the respective wire cells.

4. The system as claimed in claim 1, wherein:
    the wire mesh generation unit generates the plurality of wire cells by combining a number of neighboring cells from among the plurality of cells of the three-dimensional mesh model;
    the number of the neighboring cells included in the generated wire cells is greater than a threshold number; and
    the wire mesh generation unit adjusts a size of each wire cell so that lengths of boundaries of each generated wire cell are minimized.

5. The system as claimed in claim 1, wherein:
    the wire mesh generation unit generates the plurality of wire cells by combining sets of neighboring cells from among the plurality of cells of the three-dimensional mesh model; and
    the wire mesh generation unit adjusts the sets of the neighboring cells so that an evenness of the wire cells is lower than a threshold evenness value, the evenness being a value indicating a difference of a shape of the wire cell from a plane.

6. The system as claimed in claim 1, wherein:
    the wire mesh generation unit generates the plurality of wire cells by combining neighboring cells from among the plurality of cells of the three-dimensional mesh model; and
    each of the generated wire cells has a same number of cells.

7. The system as claimed in claim 1, wherein:
    the wire mesh generation unit generates the plurality of wire cells by combining neighboring cells from among the plurality of cells of the three-dimensional mesh model; and
    each of the generated wire cells has a same width.

8. The system as claimed in claim 1, wherein the encoding unit independently encodes the corresponding mesh data of the respective wire cells.

9. The system as claimed in claim 1, wherein the mesh data comprises geometry information of a plurality of vertexes in the three-dimensional mesh model.

10. The system as claimed in claim 1, wherein the wire mesh information comprises a number of quantization bits and a quantization range for the wire cell data.

11. The system as claimed in claim 1, further comprising:
    a wire cell selection unit to select at least one wire cell of the wire mesh in accordance with an input; and
    an output unit to output corresponding mesh data of the selected at least one wire cell.

12. The system as claimed in claim 11, further comprising a decoder to decode the wire mesh information.

13. The system as claimed in claim 11, wherein the output unit outputs the wire mesh on an output display screen and outputs the corresponding mesh data of the selected at least one wire cell on the output display screen.

14. A system to decode mesh data with random accessibility in a three-dimensional mesh model having a plurality of cells to define at least one surface of the model, the system comprising:
    a data storage unit to store encoded wire mesh information on a wire mesh of the three-dimensional mesh model and encoded wire cell data including mesh data of respective wire cells of the wire mesh;
    an output unit to decode the stored and encoded wire mesh information and to display the wire mesh on an output display screen; and
    a wire cell selection unit to select at least one wire cell of the displayed wire mesh in accordance with an input, wherein:
    the wire mesh information comprises positions in the storage unit in which the corresponding mesh data of the respective wire cells is stored,
    the output unit decodes corresponding mesh data of the selected at least one wire cell and displays the decoded mesh data on the output display screen, and each wire cell includes at least two cells of the plurality of cells, and
    each cell is in the form of a polygon.

15. The system as claimed in claim 14, wherein the wire mesh information comprises wire information to indicate boundaries of the respective wire cells.

16. The system as claimed in claim 14, further comprising a wire cell extraction unit to extract the corresponding mesh data of the selected at least one wire cell from the data storage unit.

17. The system as claimed in claim 16, wherein the wire mesh information comprises identifiers to identify the corresponding mesh data of the respective wire cells.

18. The system as claimed in claim 14, wherein the output unit decodes the corresponding mesh data of the selected at least one wire cell, and expands and displays the decoded mesh data on the output display screen.

19. The system as claimed in claim 14, wherein:
each wire cell includes a number of neighboring cells from among the plurality of cells of the three-dimensional mesh model;
the number of the neighboring cells included in the each wire cell is greater than a threshold number; and
lengths of boundaries of each wire cell are a minimum possible length.

20. The system as claimed in claim 14, wherein:
each wire cell includes a set of neighboring cells from among the plurality of cells of the three-dimensional mesh model; and
an evenness of each wire cell is lower than a threshold evenness value, the evenness being a value indicating a difference of a shape of the wire cell from a plane.

21. The system as claimed in claim 14, wherein:
each wire cell includes neighboring cells from among the plurality of cells of the three-dimensional mesh model; and
each of the wire cells has a same number of cells.

22. The system as claimed in claim 14, wherein:
each wire cell includes neighboring cells from among the plurality of cells of the three-dimensional mesh model; and
each of the wire cells has a same width.

23. The system as claimed in claim 14, wherein the data storage unit is detachably connected to the system.

24. A method of compressing mesh data with random accessibility in a three-dimensional mesh model, the method comprising:
acquiring the mesh data from the three-dimensional mesh model;
generating a wire mesh including a plurality of wire cells by using the mesh data, each wire cell including at least two cells of a plurality of cells defining at least one surface of the model;
generating wire mesh information on the wire mesh and wire cell data including mesh data of the respective wire cells; and
compressing the generated wire mesh information and the generated wire cell data, wherein:
the wire mesh information comprises positions in a storage unit in which the corresponding mesh data of the respective wire cells is stored, and
each cell is in the form of a polygon.

25. The method as claimed in claim 24, wherein the wire mesh information comprises wire information to indicate boundaries of the respective wire cells.

26. The method as claimed in claim 24, wherein the wire mesh information comprises identifiers to identify the corresponding mesh data of the respective wire cells.

27. The method as claimed in claim 24, wherein the generating of the wire mesh comprises:
generating the plurality of wire cells by combining a number of neighboring cells from among the plurality of cells of the three-dimensional mesh model;
the number of the neighboring cells included in the generated wire cells being greater than a threshold number; and
adjusting a size of each cell so that lengths of boundaries of each generated wire cell are minimized.

28. The method as claimed in claim 24, wherein the generating of the wire mesh comprises:
generating the plurality of wire cells by combining sets of neighboring cells from among the plurality of cells of the three-dimensional mesh model; and
adjusting the sets of the neighboring cells so that an evenness of the wire cells is lower than a threshold evenness value, the evenness being a value indicating a difference of a shape of the wire cell from a plane.

29. The method as claimed in claim 24, wherein the generating of the wire mesh comprises:
generating the plurality of wire cells by combining neighboring cells from among the plurality of cells of the three-dimensional mesh model; and
each of the generated wire cells has a same number of cells.

30. The method as claimed in claim 24, wherein the generating of the wire mesh comprises:
generating the plurality of wire cells by combining neighboring cells from among the plurality of cells of the three-dimensional mesh model; and
each of the generated wire cells has a same width.

31. The method as claimed in claim 24, wherein the compressing of the generated wire mesh information and the generated wire cell data comprises independently encoding the corresponding mesh data of the respective wire cells.

32. A non-transitory computer-readable recording medium encoded with the method of claim 24 and implemented by at least one computer.

33. A method of decoding mesh data with random accessibility in a three-dimensional mesh model having a plurality of cells, the method comprising:
decoding wire mesh information on a wire mesh of the three-dimensional mesh model;
selecting at least one wire cell of the wire mesh in accordance with an input; and
decoding corresponding mesh data of the selected at least one wire cell, wherein:
mesh data of respective wire cells of the wire mesh is included in wire cell data, and each wire cell includes at least two cells of the plurality of cells defining at least one surface of the model,
the wire mesh information comprises positions in a storage unit in which the corresponding mesh data of the respective wire cells is stored, and
each cell is in the form of a polygon.

34. The method as claimed in claim 33, further comprising displaying the decoded mesh data on an output display screen.

35. The method as claimed in claim 33, wherein the wire mesh information comprises wire information to indicate boundaries of the respective wire cells.

36. The method as claimed in claim 33, further comprising extracting the corresponding mesh data of the selected at least one wire cell from the storage unit that stores the wire mesh information and the wire cell data.

37. The method as claimed in claim 34, wherein the displaying comprises decoding the corresponding mesh data of the selected at least one wire cell, and expanding and displaying the decoded mesh data on the output display screen.

38. A non-transitory computer-readable recording medium encoded with the method of claim 33 and implemented by at least one computer.

39. A system to generate a wire mesh with random accessibility in a three-dimensional mesh model having mesh data defining a plurality of cells defining at least one surface of the model, the system comprising:
- a wire mesh generation unit to generate a wire mesh from the mesh model including the plurality of wire cells by using the mesh data, each wire cell including at least two cells of the plurality of cells; and
- a data structure generation unit to generate wire mesh information on the wire mesh and wire cell data including mesh data of the respective wire cells, wherein:
- the wire mesh information comprises positions in a storage unit in which the corresponding mesh data of the respective wire cells is stored, and
- each cell is in the form of a polygon.

40. A method of processing mesh data defining a plurality of cells with random accessibility in a three-dimensional mesh model, the method comprising:
- generating a wire mesh including a plurality of wire cells by using the mesh data, each wire cell including at least two cells of the plurality of cells defining at least one surface of the model;
- generating wire mesh information on the wire mesh and wire cell data including mesh data of the respective wire cells;
- selecting at least one wire cell of the wire mesh; and
- outputting corresponding mesh data of the selected at least one wire cell, wherein:
- the wire mesh information comprises positions in a storage unit in which the corresponding mesh data of the respective wire cells is stored, and
- each cell is in the form of a polygon.

41. A non-transitory computer-readable recording medium encoded with the method of claim 40 and implemented by at least one computer.

42. A method of generating a wire mesh with random accessibility in a three-dimensional mesh model, the method comprising:
- generating the wire mesh including a plurality of wire cells by using the mesh data, each wire cell including at least two cells of a plurality of cells defining at least one surface of the model; and
- generating wire mesh information on the wire mesh and wire cell data including mesh data of the respective wire cells, wherein:
- the wire mesh information comprises positions in a storage unit in which the corresponding mesh data of the respective wire cells is stored, and
- each cell is in the form of a polygon.

43. A non-transitory computer-readable recording medium encoded with the method of claim 42 and implemented by at least one computer.

44. A non-transitory computer-readable recording medium implemented by at least one computer to render a wire mesh of a three-dimensional mesh model including a plurality of wire cells that each includes at least two cells of a plurality of cells defining at least one surface of the model, the medium comprising:
- wire mesh information on the wire mesh, the wire mesh information comprising:
- wire information to indicate boundaries of the respective wire cells, and
- wire cell identifiers; and
- wire cell data including mesh data of the respective wire cells, wherein:
- the at least one computer uses the wire cell identifiers to identify the corresponding mesh data of the respective wire cells, uses the wire mesh information to display the wire mesh on an output display screen, and uses corresponding mesh data of at least one selected wire cell, according to the wire cell identifiers, to display the at least one selected wire cell on the output display screen,
- the wire mesh information comprises positions in the recording medium in which the corresponding mesh data of the respective wire cells is stored, and
- each cell is in the form of a polygon.

* * * * *